US012249752B2

(12) United States Patent
Favreau et al.

(10) Patent No.: US 12,249,752 B2
(45) Date of Patent: Mar. 11, 2025

(54) COLLAPSIBLE DIELECTRIC STANDOFF

(71) Applicant: Raytheon Company, Tewksbury, MA (US)

(72) Inventors: Channing Paige Favreau, Tewksbury, MA (US); Mikhail Pevzner, Andover, MA (US); Alexander T. Gilbert, Tewksbury, MA (US); Thomas V. Sikina, Marlboro, MA (US)

(73) Assignee: Raytheon Company, Tewksbury, MA (US)

( * ) Notice: Subject to any disclaimer, the term of this patent is extended or adjusted under 35 U.S.C. 154(b) by 36 days.

(21) Appl. No.: 17/929,374

(22) Filed: Sep. 2, 2022

(65) Prior Publication Data

US 2023/0170599 A1 Jun. 1, 2023

Related U.S. Application Data

(60) Provisional application No. 63/284,282, filed on Nov. 30, 2021, provisional application No. 63/284,288, filed on Nov. 30, 2021.

(51) Int. Cl.

| | |
|---|---|
| ***H01Q 1/12*** | (2006.01) |
| ***H01Q 1/28*** | (2006.01) |
| ***H01Q 1/48*** | (2006.01) |
| ***H01Q 9/04*** | (2006.01) |

(52) U.S. Cl.
CPC ............. *H01Q 1/1235* (2013.01); *H01Q 1/28* (2013.01); *H01Q 1/48* (2013.01); *H01Q 9/0407* (2013.01)

(58) Field of Classification Search
CPC .......... H01Q 1/1235; H01Q 1/28; H01Q 1/48; H01Q 9/0407; H01Q 1/08; H01Q 1/288
See application file for complete search history.

(56) References Cited

U.S. PATENT DOCUMENTS 9,490,540 B1 * 11/2016 Davies ................ H01Q 9/0407

OTHER PUBLICATIONS

Hashemi et al. "A flexible phased array system with low areal mass density", Nature Electronics, vol. 2, May 2019, pp. 195-205 (Year: 2019).*
International Search Report and Written Opinion mailed Dec. 23, 2022 in corresponding International Application No. PCT/US2022/076163.
Hashemi Mohammed Reza M. et al : "A flexible phased array system with low areal mass density", Nature Electronics , [Online] vol. 2 , No. 5 , May 1, 2019, pp. 195-205.

(Continued)

*Primary Examiner* — Daniel D Chang
(74) *Attorney, Agent, or Firm* — Schwegman Lundberg & Woesser, P.A.

(57) ABSTRACT

A compressible dielectric standoff configured to mount at least one antenna on a ground plane of an antenna assembly includes a ground plane end configured to contact the ground plane and at least one antenna end configured to contact the at least one antenna. The compressible dielectric standoff is movable between a compressed state in which the ground plane end is spaced apart from the at least one antenna end a first distance, and an expanded state in which the ground plane end is spaced apart from the at least one antenna end a second distance. The first distance is smaller than the second distance.

16 Claims, 9 Drawing Sheets

(56) References Cited

OTHER PUBLICATIONS

& Gdoutos Eleftherios et al: “A lightweight tile structure integrating photovoltaic conversion and RF power transfer for space solar power applications”, 2018 AIAA Spacecraft Structures Conference, Jan. 8, 2018, pp. 1-12.
Kabacik Pawel et al: “Paperweight Microwave Antenna Element and Arraying Concept”, Sep. 28, 2010, pp. 208-211.
Chahat Nacer et al : “Mars Cube One” In: “CubeSat Antenna Design”, Dec. 13, 2020 (Dec. 13, 2020) , Wiley, pp. 35-89.
“International Application Serial No. PCT US2022 076163, International Preliminary Report on Patentability mailed Jun. 13, 2024”, 13 pgs.

* cited by examiner

COLLAPSIBLE DIELECTRIC STANDOFF

This application claims the benefit of U.S. Application No. 63/284,288 filed Nov. 30, 2021 and U.S. Application No. 63/284,282, filed Nov. 30, 2021, each of which is incorporated herein by reference in its entirety.

TECHNICAL FIELD

The present disclosure relates generally to antennas, and more particularly to antennas with collapsible elements.

BACKGROUND

Antennas typically take up significant weight and volume in their packaged and transportable state. For example, even for patch antennas which are low profile flat antennas consisting of flat sheets or "patches" mounted on a larger ground plane, weight and volume allocations for accommodating such antennas can be large. In patch antenna designs, for example in space applications, the patches are fixed in place on the ground plane with a rigid dielectric substrate layer therebetween. In order to accommodate a larger number of patches for better performance of the antenna, the ground plane and rigid dielectric substrate layer need to be larger, taking up more weight and volume in a launch or transport vehicle used to transport the antenna. For example, patch antennas used in wideband low frequency applications are typically very large and heavy. However, in launch vehicles for space-based patch antenna applications, weight and volume allocations are limited. Accordingly, saving weight and volume in the launch vehicle requires either reducing the size of the ground plane and the number of patches fixed to the ground plane, sacrificing performance of the patch antenna, or launching the patch antenna in a larger launch vehicle, requiring more operational and deployment costs and considerations.

SUMMARY

An improved antenna is provided with a collapsible dielectric standoff that allows the antenna to be mounted to a ground plane such that the antenna may be a part of an antenna array that is more densely packed in a non-operational state in a transport vehicle during transportation or launch for space antennas. This allows the antenna array to fit into transport vehicles with a smaller weight and volume allocation for the antenna array and/or allows more antenna arrays to fit within the transport vehicle, supporting a higher performing system.

According to an aspect of this disclosure, a compressible dielectric standoff configured to mount at least one antenna on a ground plane of an antenna assembly includes a ground plane end configured to contact the ground plane and at least one antenna end configured to contact the at least one antenna. The compressible dielectric standoff is movable between a compressed state in which the ground plane end is spaced apart from the at least one antenna end a first distance, and an expanded state in which the ground plane end is spaced apart from the at least one antenna end a second distance, the first distance being smaller than the second distance.

According to an embodiment of any paragraph(s) of this disclosure, the compressible dielectric standoff further includes a resilient frame extending between the ground plane end and the at least one antenna end.

According to another embodiment of any paragraph(s) of this disclosure, the resilient frame includes at least one resilient arm extending between the ground plane end and the at least one antenna end.

According to another embodiment of any paragraph(s) of this disclosure, the at least one resilient arm includes at least one resilient joint at which the at least one resilient arm is configured to bend.

According to another embodiment of any paragraph(s) of this disclosure, the at least one resilient arm includes two or more maximum compression stops configured to abut each other when the compressible dielectric standoff is in the compressed state and prevent the ground plane end and the at least one antenna end from being spaced apart less than the first distance.

According to another embodiment of any paragraph(s) of this disclosure, the at least one resilient arm has a serpentine shape.

According to another embodiment of any paragraph(s) of this disclosure, the compressible dielectric standoff further includes a maximum expansion lock configured to prevent the ground plane end and the at least one antenna end from being spaced apart more than the second distance.

According to another embodiment of any paragraph(s) of this disclosure, the maximum expansion lock includes a flexible thread attached to and extending between the ground plane end and the at least one antenna end. A length of the flexible thread between the ground plane end and the at least one antenna end is the second distance.

According to another embodiment of any paragraph(s) of this disclosure, the expansion lock includes a semi-rigid arm extending between the ground plane end and the at least one antenna end. A length of the semi-rigid arm between the ground plane end and the at least one antenna end is the second distance.

According to another embodiment of any paragraph(s) of this disclosure, the semi-rigid arm is configured to bend upon a compression force sufficient to move the compressible dielectric standoff from the expanded state to the compressed state and is configured to resist bending upon an incidental force that is less than the compression force.

According to another embodiment of any paragraph(s) of this disclosure, the compressible dielectric standoff further includes an anti-buckling mechanism configured to resist movement of the compressible dielectric standoff from the expanded state to the compressed state upon an incidental force that is less than a compression force sufficient to move the compressible dielectric standoff from the expanded state to the compressed state.

According to another embodiment of any paragraph(s) of this disclosure, the at least one antenna end includes a first stacked antenna end configured to contact a first stacked antenna and a second stacked antenna end configured to contact a second stacked antenna stacked above the first stacked antenna.

According to another embodiment of any paragraph(s) of this disclosure, the compressible dielectric standoff includes a first dielectric standoff portion extending from the ground plane end to the first stacked antenna end, and a second dielectric standoff portion extending from the first stacked antenna end to the second stacked antenna end.

According to another embodiment of any paragraph(s) of this disclosure, the compressible dielectric standoff includes a spring embedded in the first dielectric standoff portion. The second dielectric standoff portion contacts the spring embedded in the first dielectric standoff portion at the first stacked antenna end such that when the compressible dielectric standoff moves from the expanded state to the compressed state, the second dielectric standoff portion compresses the spring.

According to another embodiment of any paragraph(s) of this disclosure, an outer diameter of the second dielectric standoff portion is less than an inner diameter of the first dielectric standoff portion.

According to another aspect of this disclosure, an antenna assembly includes a ground plane, at least one compressible dielectric standoff mounted on the ground plane, and at least one antenna mounted on the at least one compressible dielectric standoff such that the at least one antenna is spaced apart from the ground plane. The at least one compressible dielectric standoff is moveable between a compressed state in which the ground plane is spaced apart from the at least one antenna a first distance, and an expanded state in which the ground plane is spaced apart from the at least one antenna a second distance. The first distance is smaller than the second distance.

According to another aspect of this disclosure, an antenna assembly array includes a first antenna assembly and a second antenna assembly. The first antenna assembly includes a first ground plane, at least one first compressible dielectric standoff mounted on the first ground plane, and at least one first antenna mounted on the at least one first compressible dielectric standoff such that the at least one first antenna is spaced apart from the first ground plane. The second antenna assembly includes a second ground plane, at least one second compressible dielectric standoff mounted on the second ground plane, and at least one second antenna mounted on the at least one second compressible dielectric standoff such that the at least one second antenna is spaced apart from the second ground plane. The at least one first compressible dielectric standoff and the at least one second compressible dielectric standoff are moveable between a compressed state in which the at least one first antenna and the at least one second antenna are respectively spaced apart from the first ground plane and the second ground plane a first distance, and an expanded state in which the at least one first antenna and the at least one second antenna are respectively spaced apart from the first ground plane and the second ground plane a second distance. The first distance is smaller than the second distance. The antenna array assembly is moveable between a reduced-volume state in which the second antenna assembly is stacked over the first antenna assembly such that the at least one first antenna and the at least one second antenna contact each other in a face-to-face relationship and hold the at least one first compressible dielectric standoff and the at least one second compressible dielectric standoff in the compressed state, and an expanded-volume state in which the second antenna assembly is not stacked over the first antenna assembly such that the at least one first compressible dielectric standoff and the at least one second compressible dielectric standoff are in the expanded state.

According to an embodiment of any paragraph(s) of this disclosure, in the expanded-volume state, the second antenna assembly is laterally adjacent the first antenna assembly with a flexible panel-to-panel interface connecting the first ground plane of the first antenna assembly to the second ground plane of the second antenna assembly.

According to another aspect of this disclosure, a method of deploying the antenna assembly array according to any paragraph(s) of this disclosure includes the steps of loading the antenna assembly array into a launch vehicle by folding the antenna assembly array into the reduced-volume state, launching the launch vehicle into space, and releasing the antenna assembly from the launch vehicle into orbit in space by moving the antenna assembly array into the expanded-volume state.

According to another aspect of this disclosure, a compressible dielectric standoff configured to mount at least one antenna on a ground plane of an antenna assembly includes a ground plane end configured to contact the ground plane, at least one antenna end configured to contact the at least one antenna, and means for moving the compressible dielectric standoff between a compressed state in which the ground plane end is spaced apart from the at least one antenna end a first distance, and an expanded state in which the ground plane end is spaced apart from the at least one antenna end a second distance, the first distance being smaller than the second distance.

The following description and the annexed drawings set forth in detail certain illustrative embodiments described in this disclosure. These embodiments are indicative, however, of but a few of the various ways in which the principles of this disclosure may be employed. Other objects, advantages and novel features will become apparent from the following detailed description when considered in conjunction with the drawings.

BRIEF DESCRIPTION OF DRAWINGS

The annexed drawings show various aspects of the disclosure.

DETAILED DESCRIPTION

Figure 1:
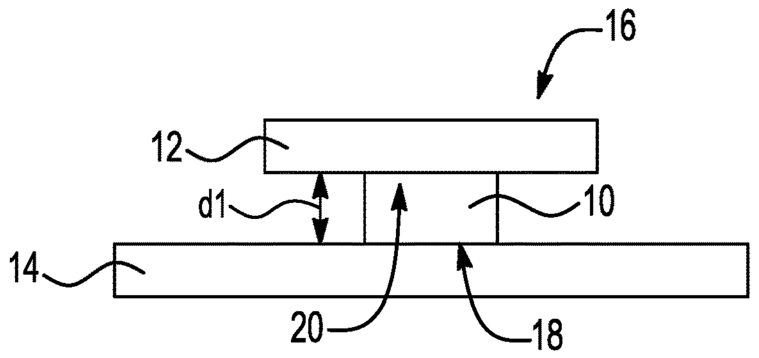
FIG. 1 is a schematic diagram of a compressible dielectric standoff of an antenna assembly in a compressed state.
Figure 2:
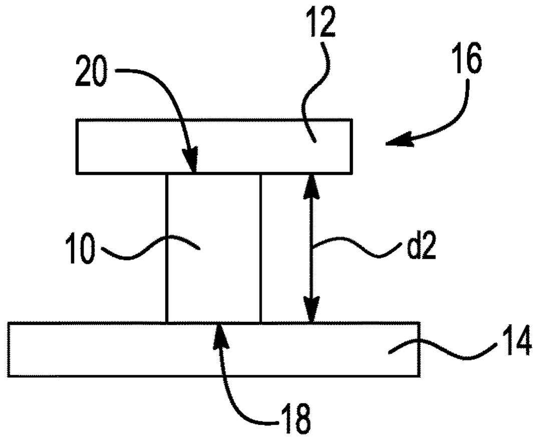
FIG. 2 is a schematic diagram of the compressible dielectric standoff of the antenna assembly of FIG. 1 in an expanded state.

With initial reference to FIGS. 1 and 2, a general schematic of a compressible dielectric standoff 10 configured to mount at least one antenna 12, for example a patch antenna, on a ground plane 14 in an antenna assembly 16, is depicted in both a compressed state (FIG. 1) and an expanded state (FIG. 2). The compressible dielectric standoff 10 includes a ground plane end 18 configured to contact the ground plane 14, and at least one antenna end 20 configured to contact the at least one antenna 12. The compressible dielectric standoff 10 is movable between the compressed state (FIG. 1), in which the ground plane end 18 is spaced apart from the at least one antenna end 20 a first distance $d_1$, and the expanded state (FIG. 2) in which the ground plane end 18 is spaced apart from the at least one antenna end 20 a second distance $d_2$. Therefore, in the compressed state (FIG. 1) of the compressible dielectric standoff 10, the ground plane 14 of the antenna assembly 16 is spaced apart from the at least one antenna 12 of the antenna assembly 16 the first distance $d_1$, and in the expanded state (FIG. 2) of the compressible dielectric standoff 10, the ground plane 14 of the antenna assembly 16 is spaced apart from the at least one antenna 12 of the antenna assembly 16 the second distance $d_2$. The first distance $d_1$ is smaller than the second distance $d_2$. For example, the first distance $d_1$ may be in a range of 30% to 90%, 40% to 80%, or 50% to 70% smaller than the second distance $d_2$.

In the compressed state of the compressible dielectric standoff 10 (FIG. 1), the antenna assembly 16 is in a non-operational state and in the expanded state of the compressible dielectric standoff 10 (FIG. 2), the antenna assembly 16 is in an operational state. That is, in the expanded state (FIG. 2), the compressible dielectric standoff 10 is specifically designed and constructed based on the intended frequency and bandwidth of the antenna assembly 16 such that the second distance $d_2$ is predefined for optimal performance and operation of the antenna assembly 16. The ground plane 14 may include a board with active components and there may be an electrical interface (conductor) between the board and the at least one antenna 12.

Figure 3:
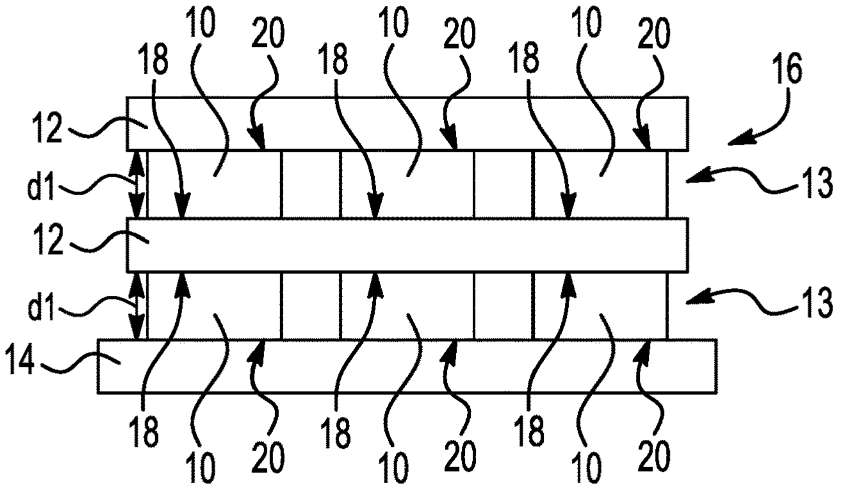
FIG. 3 is a schematic diagram of an antenna assembly having more than one compressible dielectric standoff in a compressed state.
Figure 4:
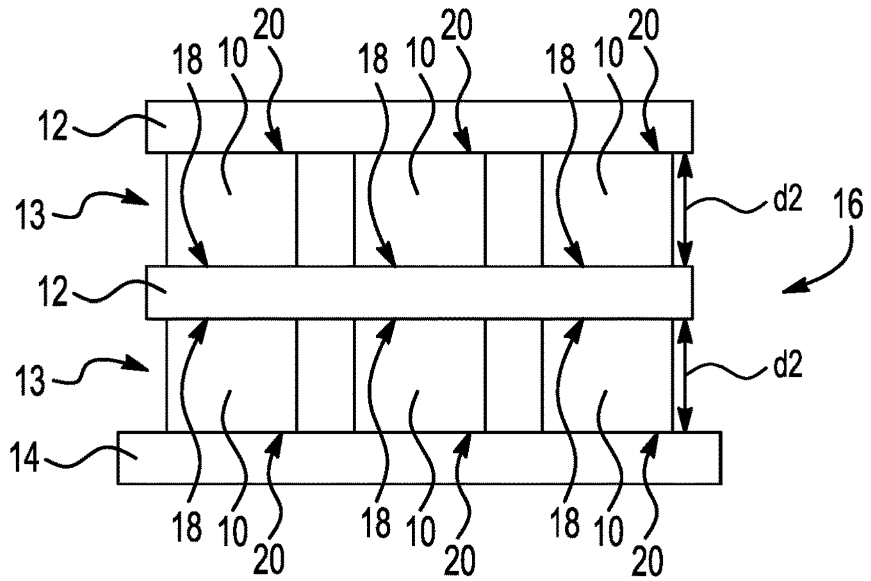
FIG. 4 is a schematic diagram of the antenna assembly having more than one compressible dielectric standoff of FIG. 3 in an expanded state.

As depicted in the schematic diagrams of FIGS. 3 and 4, the antenna assembly 16 may have a plurality of compressible dielectric standoffs 10 arranged between the ground plane 14 and the at least one antenna 12 to form a dielectric layer 13. By having a large amount of empty space in the dielectric layer 13, the effective loss tangent may be decreased dramatically. Additionally, as depicted in FIGS. 3 and 4, the antenna assembly 16 may have more than one antenna 12 stacked on top of each other, and therefore more than one dielectric layer 13. In a second layer stacked upon a first layer, therefore the ground plane end 18 of the at least one compressible dielectric standoff 10 of the second layer actually contacts the antenna 12 of the first layer and the antenna end 20 of the at least one compressible dielectric standoff 10 of the second layer contacts the antenna 12 of the second layer. The dielectrics of the dielectric layers 13 can be tuned to have a desired effective dielectric constant by choosing the specific material and specific number of compressible dielectric standoffs 10. For example, possible materials for the compressible dielectric standoffs 10 include polymers such as polyether ether ketone (PEEK), polyetherimide (PEI), polycarbonate, composites or ceramics. It is understood, however, that these example materials of the at least one dielectric standoff 10 are non-limiting and that other materials may be appropriate, depending on the desired effective dielectric constant for the dielectric layers 13.

Figure 5:
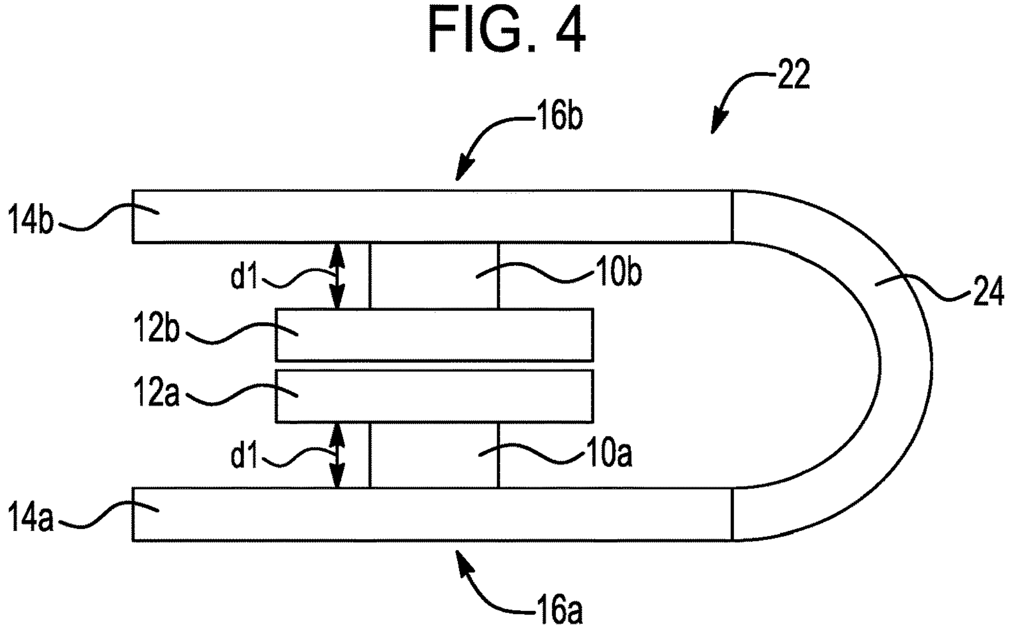
FIG. 5. is a schematic diagram of an antenna assembly array in a reduced-volume state.
Figure 6:
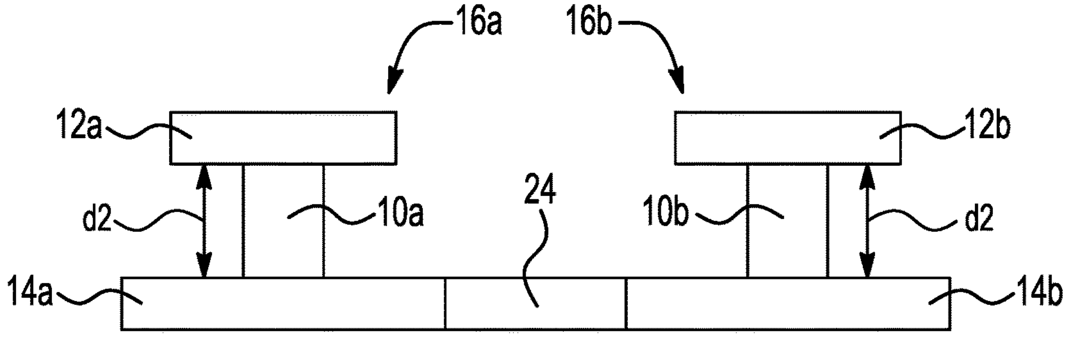
FIG. 6 is a schematic diagram of the antenna assembly array of FIG. 5 in an expanded-volume state.

Two or more antenna assemblies **16*a*, 16*b*, such as those described above with reference to FIGS. 1-4, may be provided in an antenna assembly array 22, as depicted in FIGS. 5 and 6. For example, the antenna assembly array 22 may include a first ground plane 14*a* of a first antenna assembly 16*a* and a second ground plane 14*b* of a second antenna assembly 16*b*. At least one first compressible dielectric standoff 10*a* of the first antenna assembly 16*a* is mounted on the first ground plane 14*a* and at least one second compressible dielectric standoff 10*b* of the second antenna assembly 16*b* is mounted on the second ground plane 14*b*. At least one first antenna 12*a* of the first antenna assembly 16*a* is mounted on the at least one first compressible dielectric standoff 10*a* such that the at least one first antenna 12*a* is spaced apart from the first ground plane 14*a*. Similarly, at least one second antenna 12*b* of the second antenna assembly 16*b* is mounted on the at least one second compressible dielectric standoff 10*b* such that the at least one second antenna 12*b* is spaced apart from the second ground plane 14*b*. The first ground plane 14*a* of the first antenna assembly 16*a* may be connected to the second ground plane 14*b* of the second antenna assembly 16*b* with, for example, a flexible panel-to-panel interface 24. As described above, the at least one first compressible dielectric standoff 10*a* and the at least one second compressible dielectric standoff 10*b* are moveable between a compressed state (FIG. 5) in which the at least one first antenna 12*a* and the at least one second antenna 12*b* are respectively spaced apart from the first ground plane 14*a* and the second ground plane 14*b* the first distance $d_1$, and an expanded state in which the at least one first antenna 12*a* and the at least one second antenna 12*b* are respectively spaced apart from the first ground plane 14*a* and the second ground plane 14*b*** the second distance $d_2$.

The antenna assembly array 22 may be useful in space-based applications in which the antenna assembly array 22 needs to be loaded into a launch vehicle for launch into space and deployment into orbit. As weight and volume allocations for the antenna assembly array 22 are limited in launch vehicles, the antenna assembly array 22 may be loaded into the launch vehicle with the first and second compressible dielectric standoffs **10*a*, 10*b* in the compressed state and the antenna assemblies 16*a*, 16*b* in the non-operational state. Once launched and deployed into orbit, the antenna assembly array 22 may be deployed such that the first and second compressible dielectric standoffs 10*a*, 10*b* expand to the expanded state and the antenna assemblies 16*a*, 16*b* transform to the operational state. Accordingly, the antenna array 22 is moveable between a reduced-volume state (FIG. 5) and an expanded-volume state (FIG. 6**).

In the reduced-volume state (FIG. 5), the second antenna assembly **16*b* is stacked over the first antenna assembly 16*a* such that the at least one first antenna 12*a* and the at least one second antenna 12*b* contact each other in a face-to-face relationship and hold the at least one first compressible dielectric standoff 10*a* and the at least one second compressible dielectric standoff 10*b* in the compressed state. For example, the second antenna assembly 16*b* may be stacked over the first antenna assembly 16***a* by folding the antenna assembly array 22 at the flexible panel-to-panel interface 24. The at least one first compressible dielectric standoff 10*a* and the at least one second compressible dielectric standoff 10*b* may be biased toward the expanded state. Accordingly, by stacking the second antenna assembly 16*a* over the first antenna assembly 16*b* and contacting the at least one first antenna 12*a* and the at least one second antenna 12*b* in a face-to-face relationship, the at least one first compressible dielectric standoff 10*a* and the at least one second compressible dielectric standoff 10*b* may be held against their bias in the compressed state.

In the expanded-volume (FIG. 6), the second antenna assembly 16*b* may be laterally adjacent the first antenna assembly 16*a*, or otherwise not stacked over the first antenna assembly 16*a*, such that that the at least one first compressible dielectric standoff 10*a* and the at least one second compressible dielectric standoff 10*b* are in the expanded state. That is, in the expanded-volume state (FIG. 6), the second antenna assembly 16*b* is not stacked over the first antenna assembly 16*a* and the at least one first antenna 12*a* and the at least one second antenna 12*b* do not contact each other in a face-to-face relationship and therefore do not hold the at least one first compressible dielectric standoff 10*a* and the at least one second compressible dielectric standoff 10*b* against their bias in the compressed state. The at least one first compressible dielectric standoff 10*a* and the at least one second compressible dielectric standoff 10*b* are therefore free to move to the expanded state.

It is understood that the stacking of the second antenna assembly 16*b* over the first antenna assembly 16*a* is provided as a non-limiting example of holding the antenna array 22 in the reduced-volume state, and that other mechanisms may be used to hold the at least one first compressible dielectric standoff 10*a* and the at least one second compressible dielectric standoff 10*b* against their bias in the compressed state. For example, a fixed structure or other retention feature may be utilized to temporarily hold the at least one first compressible dielectric standoff 10*a* and the at least one second compressible dielectric standoff 10*b* in their compressed state until the antenna array 22 is ready to be deployed. When the antenna array 22 is ready to be deployed, the fixed structure or other retention feature may release the at least one first compressible dielectric standoff 10*a* and the at least one second compressible dielectric standoff 10*b* to their expanded state.

The compressible dielectric standoff 10, 10*a*, 10*b* described herein is specifically designed based on its material properties and geometry to have a desired, predefined stiffness and movement. Various example configurations and features of the compressible dielectric standoff 10, 10*a*, 10*b* will now be described with reference to FIGS. 7-21. In the embodiments depicted in FIGS. 7-19, the compressible dielectric standoff 10, 10*a*, 10*b* includes the ground plane end 18 and the antenna end 20, as previously described, along with a resilient frame 22*a*, 22*b*, 22*c* extending between and connecting the respective ground plane end 18 and the antenna end 20. The resilient frame 22*a*, 22*b*, 22*c* includes at least one resilient arm 24*a*, 24*b*, 24*c* extending between and connecting the ground plane end 18 and the antenna end 20.

Figure 7:
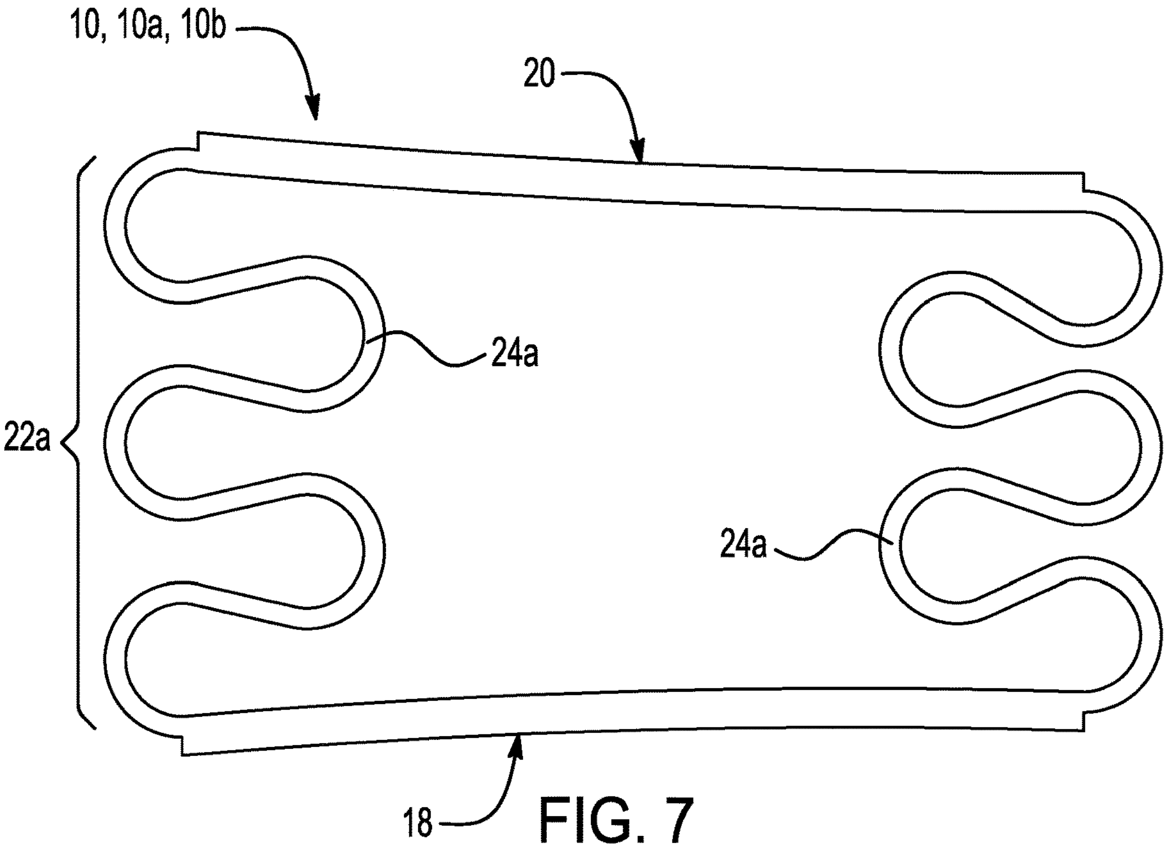
FIG. 7 is a side view of a compressible dielectric standoff in a compressed state.
Figure 8:
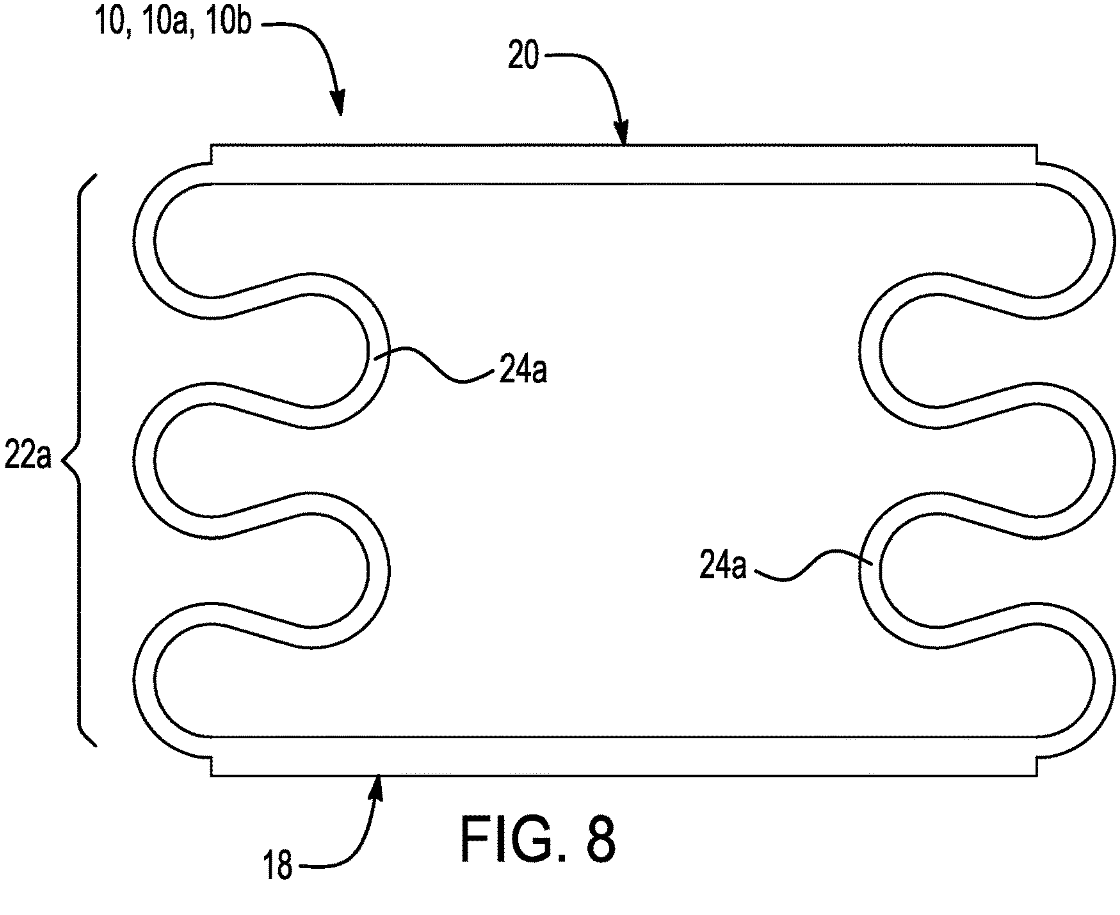
FIG. 8 is a side view of the compressible dielectric standoff of FIG. 7 in an expanded state.

In the resilient frame 22*a* of the compressible dielectric standoff 10, 10*a*, 10*b* depicted in FIGS. 7 and 8, for example, the at least one resilient arm 24*a* has a serpentine shape. The at least one resilient arm 24*a* is configured to flex with a compression force applied thereto, the compression force being sufficient to move the compressible dielectric standoff 10, 10*a*, 10*b* from the expanded state (FIG. 8) to the compressed state (FIG. 7). The at least one resilient arm 24*a* may connect the ground plane end 18 and the antenna end 20 at one or more respective lateral end thereof, as pictured, or at any other point along the length of the ground plane end 18 and the antenna end 20. The at least one resilient arm 24*a* may be made of a same material as the ground plane end 18 and the antenna end 20 and may be of a smaller thickness. The at least one resilient arm 24*a* may have a length of about 2.54 centimeters and a thickness of about 0.127 centimeters, however it is understood that the precise dimensions will depend on the required antenna height, compression force and dielectric constant for the particular application in which it is used.

Figure 9:
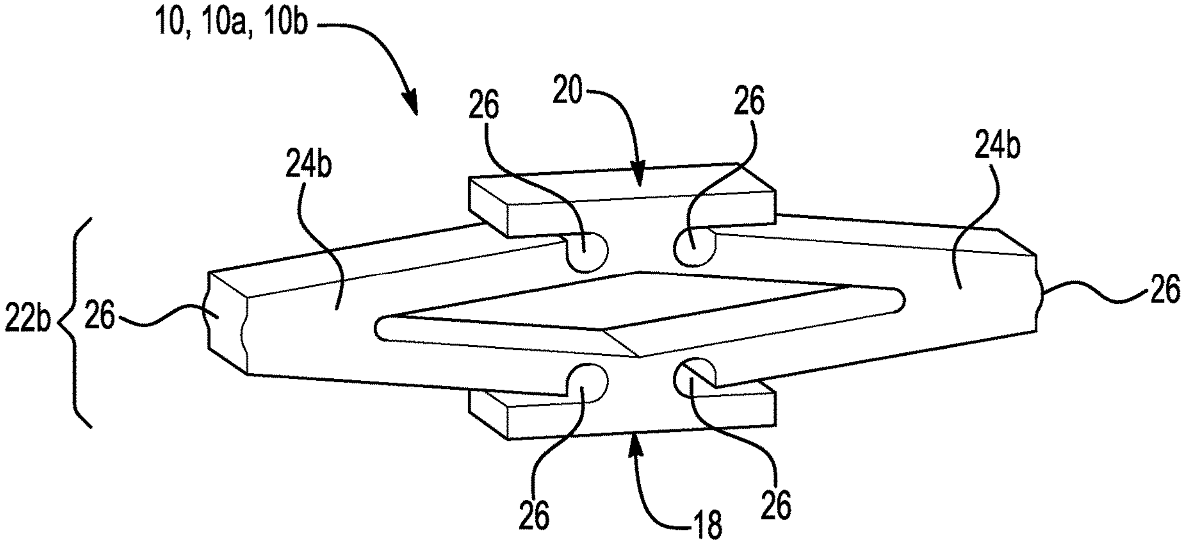
FIG. 9 is a perspective view of a compressible dielectric standoff in a compressed state.
Figure 10:
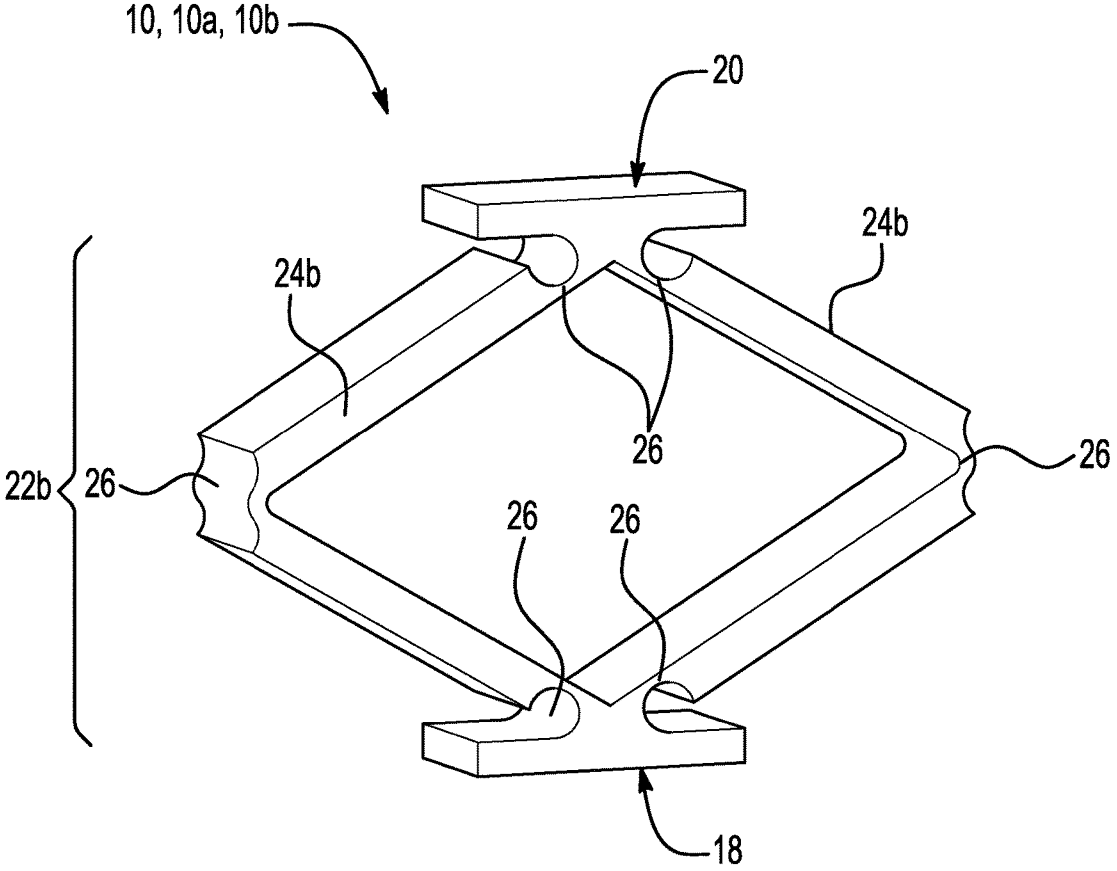
FIG. 10 is a perspective view of the compressible dielectric standoff of FIG. 9 in an expanded state.

In the resilient frame 22*b* of the compressible dielectric standoff 10, 10*a*, 10*b* depicted in FIGS. 9 and 10, the at least one resilient arm 24*b* has a folding configuration in which the at least one resilient arm 24*b* includes at least one resilient joint 26 at which the at least one resilient arm 24*b* is configured to bend. For example, each of the at least one resilient arm 24*b* may include a resilient joint 26 at a center point between where the respective at least one resilient arm 24*b* connects to the ground plane end 18 and the antenna end 20. Each of the at least one resilient arm 24*b* may also include a resilient joint 26 where the respective at least one resilient arm 24*b* connects to the ground plane end 18 and/or the antenna end 20. The at least one resilient arm 24*b* is configured to bend at the respective at least one resilient joint 26 with the compression force applied thereto, the compression force being sufficient to compress the compressible dielectric standoff 10, 10*a*, 10*b* from the expanded state (FIG. 10) to the compressed state (FIG. 9). The resilient arm 24*b* may be configured, via the at least one resilient joint 26, to unbend a maximum amount to move the compressible dielectric standoff 10, 10*a*, 10*b* to the expanded state (FIG. 10). For example, the at least one resilient joint 26 may include a hinge that has a maximum opened state. The compressible dielectric standoff 10, 10*a*, 10*b* is configured to be in the expanded state (FIG. 10) when the hinge is in the maximum opened state, such that the compressible dielectric standoff 10, 10*a*, 10*b* does not expand further than this expanded state. The at least one resilient arm 24*b* may be made of a same material as the ground plane end 18 and the antenna end 20. The at least one resilient joint 26 may also be made of the same material as the ground plane end 18, the antenna end 20 and the at least one resilient arm 24*b*, and may have a smaller thickness. The at least one resilient arm 24*b* may have a length of about 2.54 centimeters and a thickness of about 0.127 centimeters, however it is understood that the precise dimensions will depend on the required antenna height, compression force and dielectric constant for the particular application in which it is used.

Figure 11:
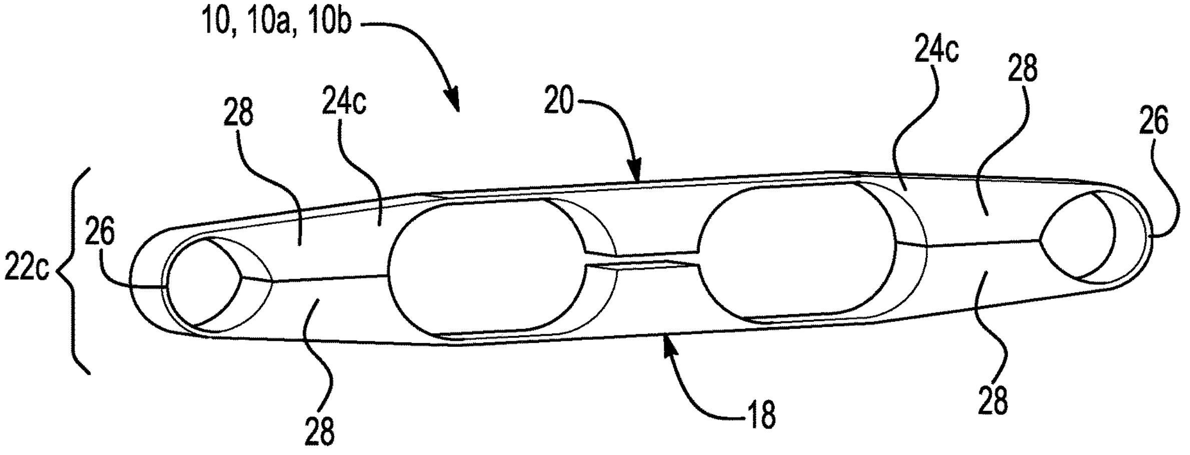
FIG. 11 is a perspective view of a compressible dielectric standoff in a compressed state.
Figure 12:
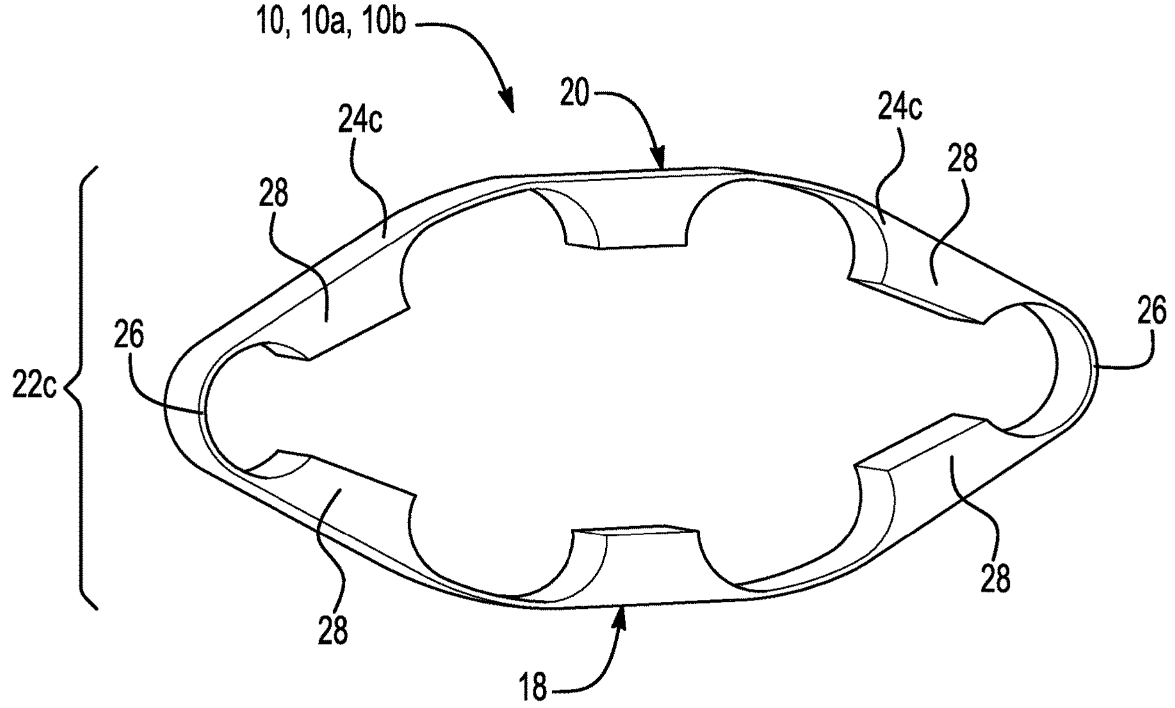
FIG. 12 is a perspective view of the compressible dielectric standoff of FIG. 11 in an expanded state.
Figure 13:
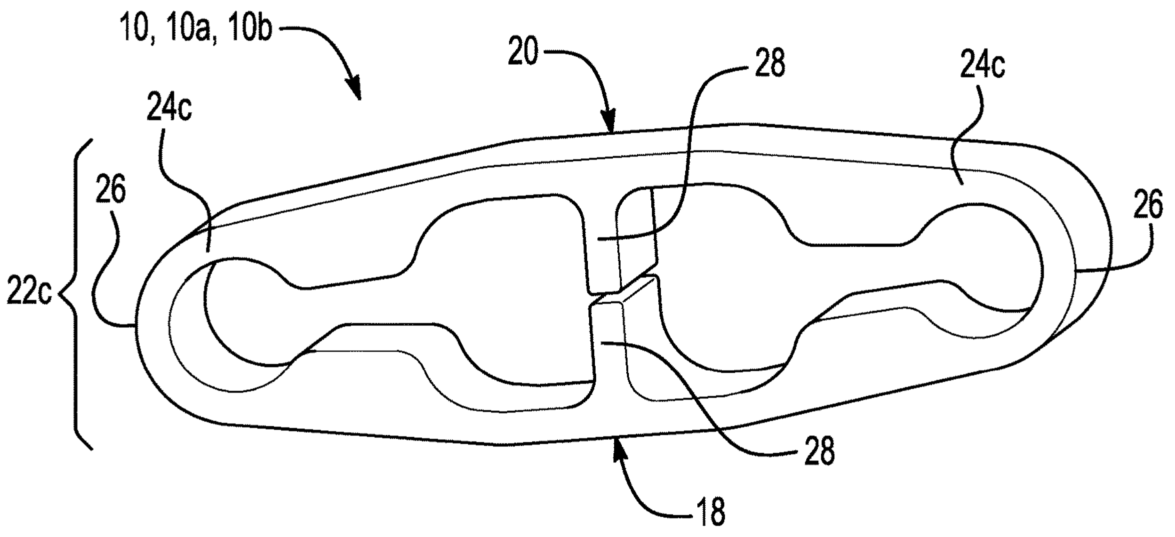
FIG. 13 is a perspective view of a compressible dielectric standoff in a compressed state.
Figure 14:
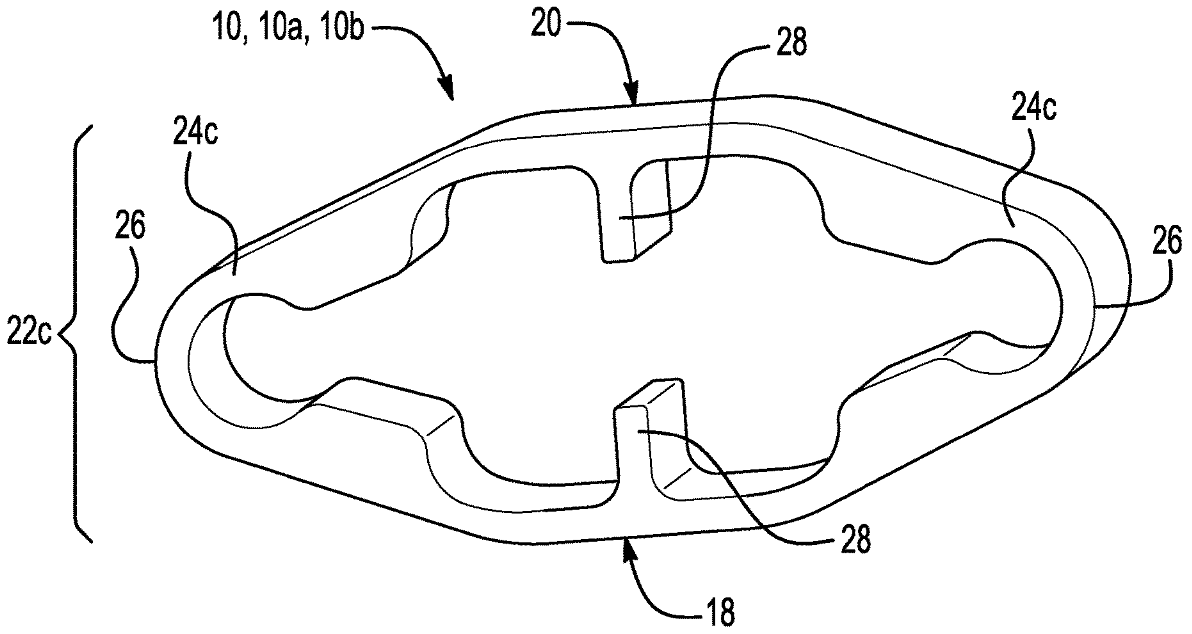
FIG. 14 is a perspective view of the compressible dielectric standoff of FIG. 13 in an expanded state.

In the resilient frame 22*c* of the compressible dielectric standoff 10, 10*a*, 10*b* depicted in FIGS. 11-14, the at least one resilient arm 24*c* is similar to the at least one resilient arm 24*b* described above and also includes at least one resilient joint 26 at a center point between where the respective at least one resilient arm 24*c* connects to the ground plane end 18 and the antenna end 20. However, the at least one resilient arm 24*c* further includes two or more maximum compression stops 28 configured to abut each other when the compressible dielectric standoff 10, 10*a*, 10*b* is in the compressed state (FIGS. 11 and 13) and prevent the at least one resilient arm 24*c* from compressing past its elastic limit (or past the first distance $d_1$). At least one of the two or more maximum compression stops 28 may be provided on one side of the center point of the at least one resilient arm 24*c* at which the resilient joint 26 is located, and at least another one of the two or more maximum compression stops 28 may be provided on the other side of the center point of the respective at least one resilient arm 24*c* at which the resilient joint 26 is located, as depicted in FIGS. 11 and 12. As shown in FIGS. 13 and 14, however, at least one of the two or more maximum compression stops 28 may additionally or alternatively extend from the ground plane end 18 and the at least one antenna end 20 inwardly toward each other. At any location, the two or more maximum compression stops 28 are configured to abut each other when the compressible dielectric standoff 10, 10*a*, 10*b* is moved from the expanded state (FIGS. 12 and 14) to the compressed state (FIGS. 11 and 13) and prevent the ground plane end 18 and the at least one antenna end 20 from being spaced apart less than the first distance $d_1$.

Figure 15:
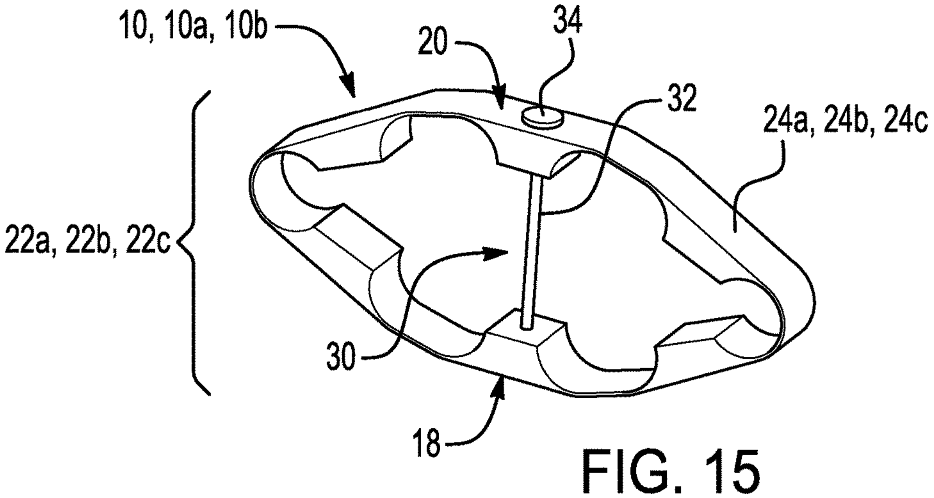
FIG. 15 is a perspective view of a compressible dielectric standoff in an expanded state.
Figure 16:
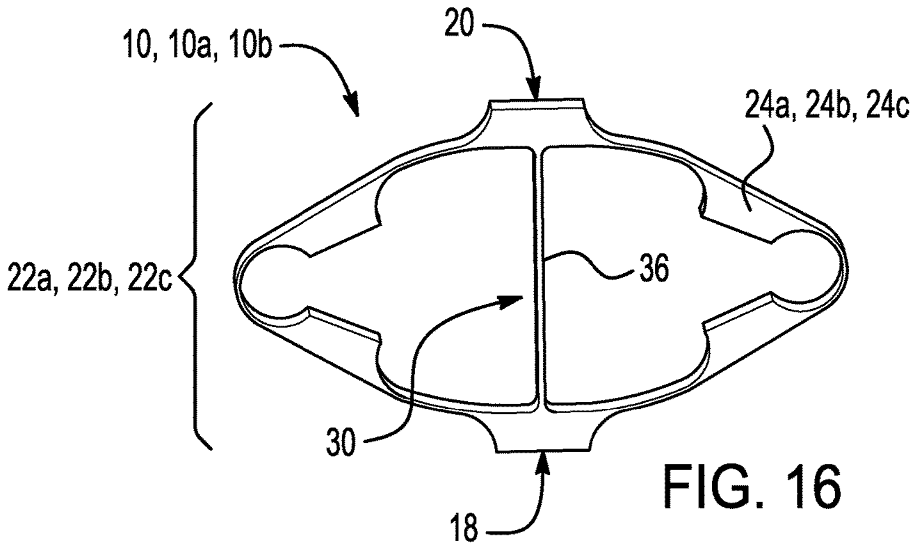
FIG. 16 is a side view of a compressible dielectric standoff in an expanded state.
Figure 17:
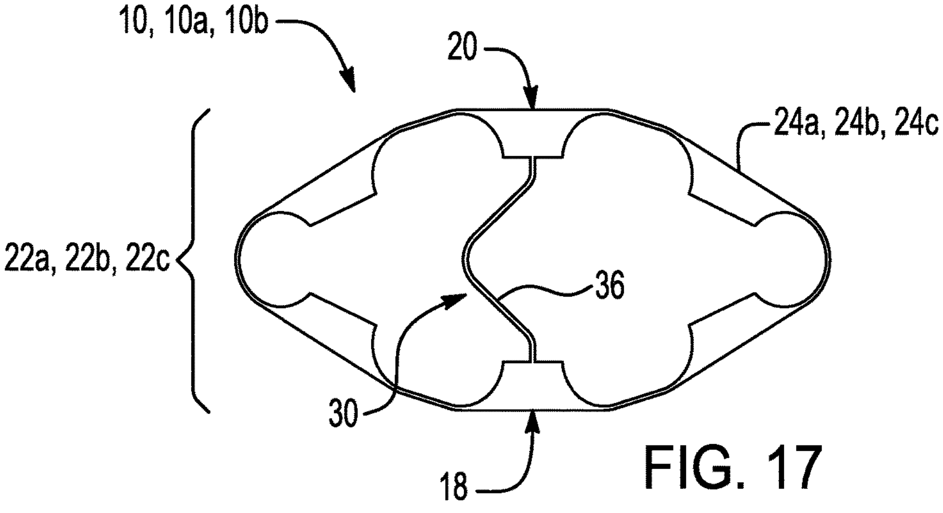
FIG. 17 is a side view of a compressible dielectric standoff in a compressed state.

With reference to FIGS. 15-17, the compressible dielectric standoff 10, 10*a*, 10*b* may additionally include a maximum expansion lock 30 configured to prevent the ground plane end 18 and the at least one antenna end 20 from being spaced apart more than the second distance $d_2$, at which the antenna assembly 16 is optimized for performance in operation. It is understood that although the resilient frame 22*a*, 22*b*, 22*c* of the compressible dielectric standoff 10, 10*a*, 10*b* depicted in FIGS. 15-16 resemble that described above with reference to FIGS. 11-14, the maximum expansion lock 30 is not limited to those embodiments and may be applied to the compressible dielectric standoff 10, 10*a*, 10*b* having any resilient frame 22*a*, 22*b*, 22*c* described herein. The maximum expansion lock 30 may include a flexible thread 32 attached to and extending between the ground plane end 18 and the at least one antenna end 20. The flexible thread 32 may be attached at each end to the ground plane end 18 and the at least one antenna end 20 with, for example, at least one fastener 34, as pictured in FIG. 15. A length of the flexible thread 32 between the ground plane end 18 and the at least one antenna end 20 is the second distance $d_2$. A material of the thread 32 may be, as a non-limiting example, nylon.

Alternatively, the maximum expansion lock 30 may include a semi-rigid rod 36 attached to and extending between the ground plane end 18 and the at least one antenna end 20, as pictured in FIG. 16. The semi-rigid rod 36 may be attached at each end to the ground plane end 18 and the at least one antenna end 20 with the at least one fastener 34, or may alternatively be formed as a unitary piece with the ground plane end 18 and the at least one antenna end 20 of the compressible dielectric standoff 10, 10*a*, 10*b*, as pictured in FIG. 16. A length of the rod 36 between the ground plane end 18 and the at least one antenna end 20 is the second distance $d_2$. In the embodiment in which the maximum expansion lock 30 is the semi-rigid rod 36, the semi-rigid rod 36 may also provide an anti-buckling function for the compressible dielectric standoff 10, 10*a*, 10*b* when the compressible dielectric standoff 10, 10*a*, 10*b* is in the expanded state. Specifically, the semi-rigid rod 36 may be formed of a semi-rigid material that is flexible enough that it can bend upon application of the compression force sufficient to move the compressible dielectric standoff 10, 10*a*, 10*b* from the expanded state to the compressed state (as depicted in FIG. 17), but rigid enough that it can withstand and prevent bending upon application of any incidental force that is less than the compression force. Therefore, when the compressible dielectric standoff 10, 10*a*, 10*b* is in the expanded state and experiences any incidental vibration or forces, the semi-rigid rod 36 serving as the anti-buckling member will prevent the compressible dielectric standoff 10, 10*a*, 10*b* from moving from the expanded state to the compressed state.

Figure 18:
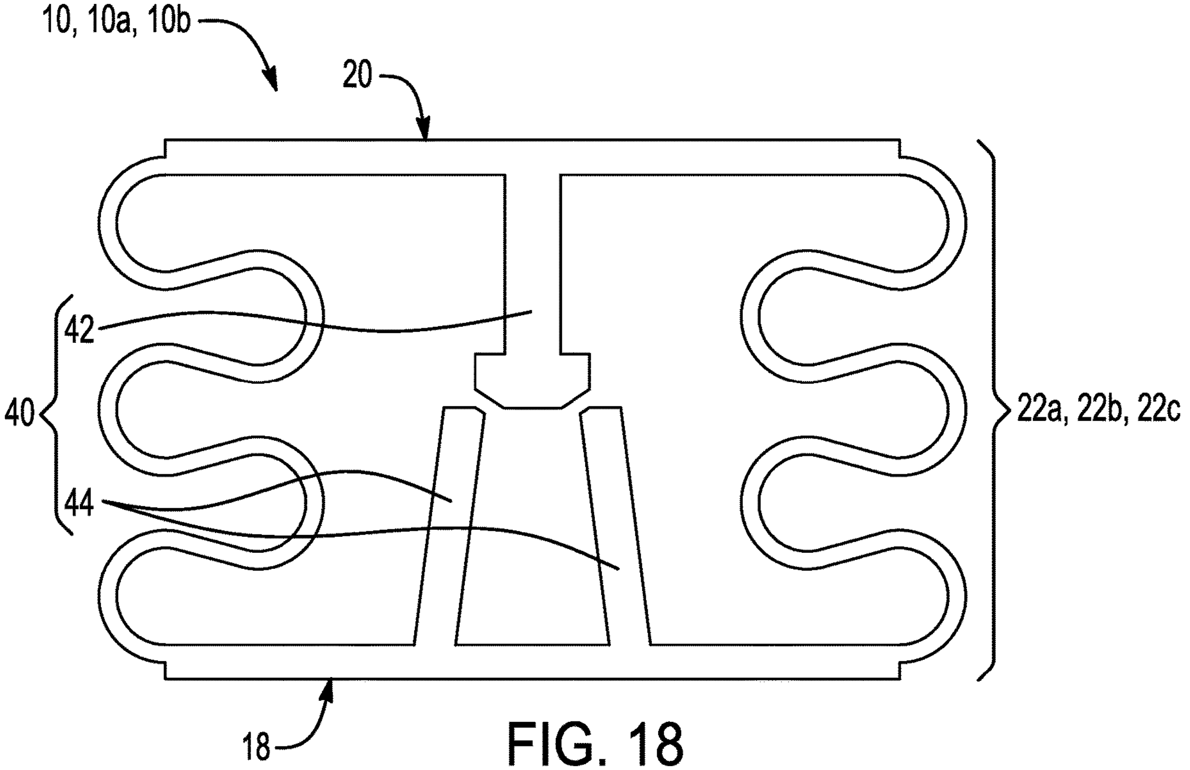
FIG. 18 is a side view of a compressible dielectric standoff in an expanded state.
Figure 19:
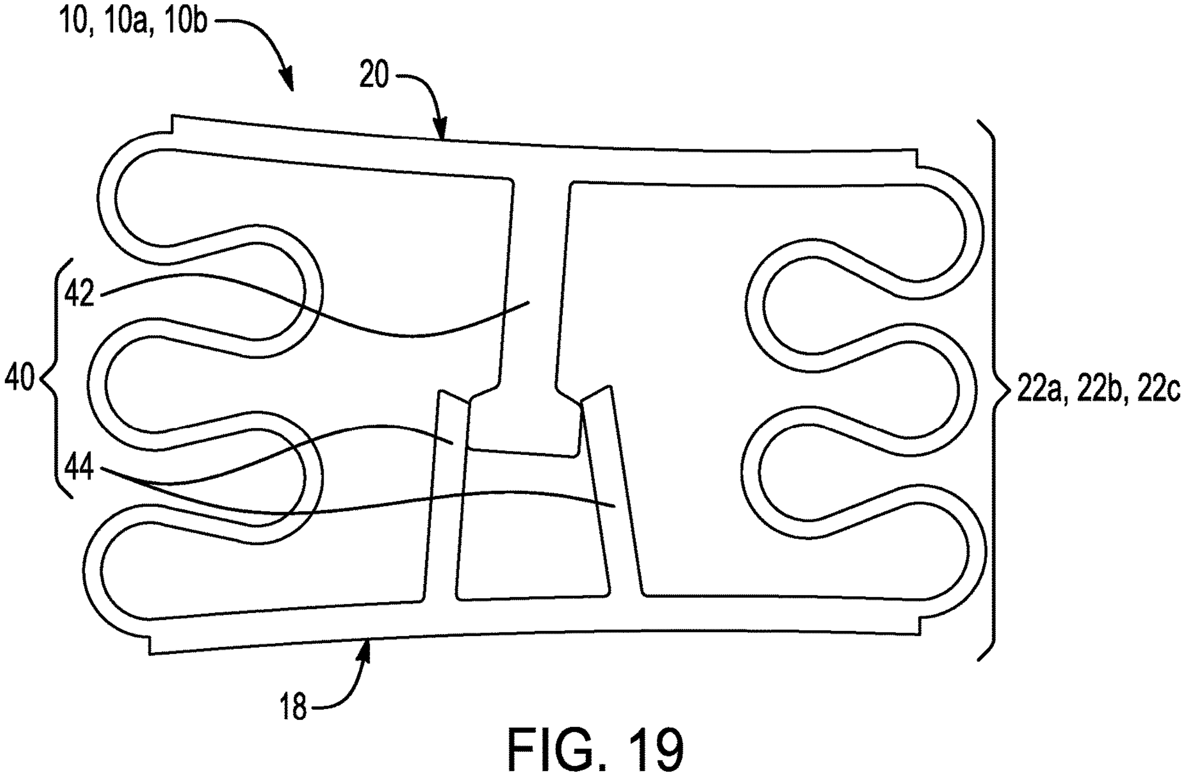
FIG. 19 is a side view of the compressible dielectric standoff of FIG. 18 in a compressed state.

As depicted in FIGS. 18 and 19, the compressible dielectric standoff 10, 10*a*, 10*b* may additionally or alternatively have a designated anti-buckling mechanism 40. It is understood that although the resilient frame 22*a*, 22*b*, 22*c* of the compressible dielectric standoff 10, 10*a*, 10*b* depicted in FIGS. 18 and 19 resemble that described above with reference to FIGS. 11-14, the designated anti-buckling mechanism 40 is not limited to those embodiments and may be applied to the compressible dielectric standoff 10, 10*a*, 10*b* having any resilient frame 22*a*, 22*b*, 22*c* described herein. The anti-buckling mechanism 40 of this embodiment includes an anti-buckling rod 42 extending from the antenna end 20 and an anti-buckling rod stop 44 extending from the ground plane 18, the anti-buckling rod 42 and the anti-buckling rod stop 44 extending toward each other. The anti-buckling rod 42 may alternatively extend from the ground plane end 18 and the anti-buckling rod stop 44 may alternatively extend from the antenna end 20. The anti-buckling rod 42 is configured to abut the at least one anti-buckling rod stop 44 when the compressible dielectric standoff 10, 10*a*, 10*b* is in the expanded state (FIG. 18). When the compression force sufficient to move the compressible dielectric standoff 10, 10*a*, 10*b* from the expanded state (FIG. 18) to the compressed state (FIG. 19) is applied to the compressible dielectric standoff 10, 10*a*, 10*b*, the anti-buckling rod 42 is configured to slide past the anti-buckling rod stop 44. However, upon application of any incidental force that is less than the compression force, the anti-buckling rod 42 is configured to abut and not slide past the anti-buckling rod stop 44. The anti-buckling rod 42 and the anti-buckling rod stop 44 depicted in FIGS. 18 and 19 are provided as non-limiting examples and it is understood that the anti-buckling rod 42 and the anti-buckling rod stop 44 may take on a variety of different shapes. For example, the anti-buckling rod stop 44 may have multiple rods as depicted in FIGS. 18 and 19, or may alternatively have, for example, a single cone-shaped rod. It is understood that other shapes and configurations may be employed to achieve the purpose of the anti-buckling rod 42 and the anti-buckling rod stop 44 described herein.

Figure 20:
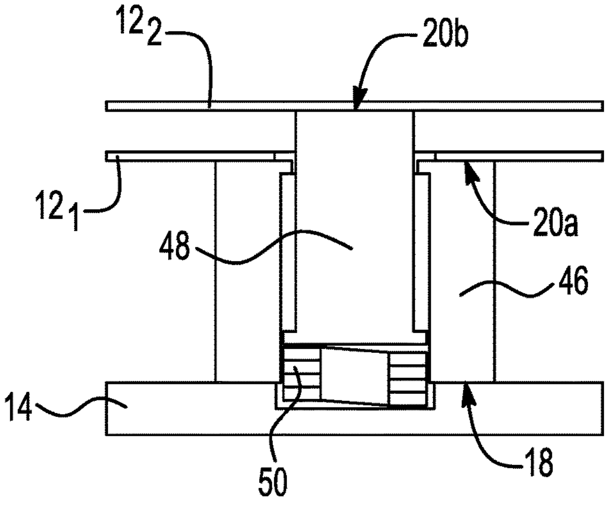
FIG. 20. is a cross-sectional side view of a compressible dielectric standoff in a compressed state.
Figure 21:
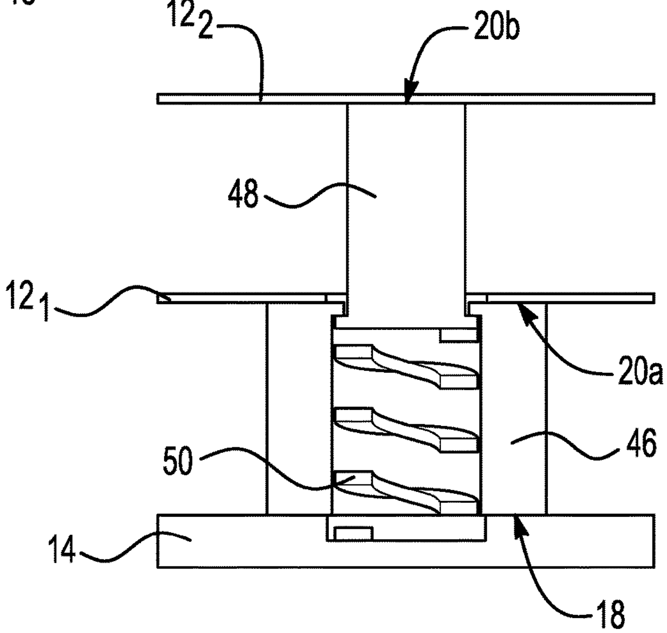
FIG. 21 is a cross-sectional side view of the compressible dielectric standoff of FIG. 20 in an expanded state.

In the compressible dielectric standoff 10, 10*a*, 10*b* depicted in FIGS. 20-21, the at least one antenna end 20 includes a first stacked antenna end 20*a* configured to contact a first stacked antenna $\mathbf{12}_1$ and a second stacked antenna end 20*b* configured to contact a second stacked antenna $\mathbf{12}_2$, stacked above the first stacked antenna $\mathbf{12}_1$. The compressible dielectric standoff 10, 10*a*, 10*b* according to this embodiment further includes a first dielectric standoff portion 46 extending from the ground plane end 18 to the first stacked antenna end 20*a* and a second dielectric standoff portion 48 extending from the first stacked antenna end 20*a* to the second stacked antenna end 20*b*. The first dielectric standoff portion 46 has a spring 50 embedded therein. Specifically, the spring 50 is held within an inner diameter of the first dielectric standoff portion 46. The second dielectric standoff portion 48 contacts the spring at the first stacked antenna end. The second dielectric standoff portion 48 has an outer diameter that is less than the inner diameter of the first dielectric standoff portion 46 such that when the compressible dielectric standoff 10, 10*a*, 10*b* moves from the expanded state (FIG. 21) to the compressed state (FIG. 20), the second dielectric standoff portion 48 contacts and compresses the spring 50 embedded in the first dielectric standoff portion 46.

Figure 22:
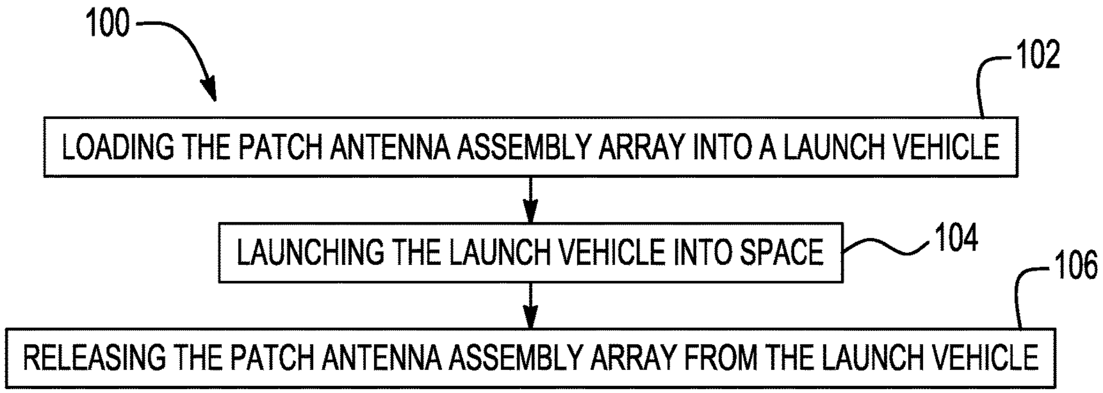
FIG. 22 is a flowchart of a method of deploying an antenna assembly array.

A method 100 of deploying the antenna assembly array described above with reference to FIGS. 5 and 6 will now be briefly described with reference to the flowchart depicted in FIG. 22. The antenna assembly array may be, therefore, as described above and may include the antenna assembly 16 having the compressible dielectric standoff 10, 10*a*, 10*b* according to any embodiment described herein. The method 100 includes a step 102 of loading the antenna assembly array into a launch vehicle. The step 102 of loading the antenna assembly array into the launch vehicle may include folding the antenna assembly array into the reduced-volume state (FIG. 5), as described above. The method 100 then includes a step 104 of launching the launch vehicle into space. The method 100 then includes a step 106 of releasing the antenna assembly from the launch vehicle into orbit in space. The step 106 of releasing the antenna assembly therefore may include moving the antenna assembly from the reduced-volume state (FIG. 5) to the expanded-volume state (FIG. 6), as described above.

Although the above disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:

1. A compressible dielectric standoff configured to mount at least one antenna on a ground plane of an antenna assembly, the compressible dielectric standoff comprising:

a ground plane end configured to contact the ground plane; and at least one antenna end configured to contact the at least one antenna;

a resilient frame extending between the ground plane end and the at least one antenna end;

wherein the compressible dielectric standoff is movable between a compressed state in which the ground plane end is spaced apart from the at least one antenna end a first distance, and an expanded state in which the ground plane end is spaced apart from the at least one antenna end a second distance, the first distance being smaller than the second distance.

2. The compressible dielectric standoff according to claim 1, wherein the resilient frame includes at least one resilient arm extending between the ground plane end and the at least one antenna end.

3. The compressible dielectric standoff according to claim 2, wherein the at least one resilient arm includes at least one resilient joint at which the at least one resilient arm is configured to bend.

4. The compressible dielectric standoff according to claim 2, wherein the at least one resilient arm includes two or more maximum compression stops configured to abut each other when the compressible dielectric standoff is in the compressed state and prevent the ground plane end and the at least one antenna end from being spaced apart less than the first distance.

5. The compressible dielectric standoff according to claim 2, wherein the at least one resilient arm has a serpentine shape.

6. The compressible dielectric standoff according to claim 1, further comprising an anti-buckling mechanism configured to resist movement of the compressible dielectric standoff from the expanded state to the compressed state upon an incidental force that is less than a compression force sufficient to move the compressible dielectric standoff from the expanded state to the compressed state.

7. An antenna assembly, comprising:

a ground plane;

at least one compressible dielectric standoff mounted on the ground plane;

at least one antenna mounted on the at least one compressible dielectric standoff such that the at least one antenna is spaced apart from the ground plane; and a maximum expansion lock configured to prevent a ground plane end and at least one antenna end from being spaced apart more than a second distance;

wherein the at least one compressible dielectric standoff is moveable between a compressed state in which the ground plane is spaced apart from the at least one antenna a first distance, and an expanded state in which the ground plane is spaced apart from the at least one antenna the second distance, the first distance being smaller than the second distance.

8. The antenna assembly according to claim 7, wherein the maximum expansion lock includes a flexible thread attached to and extending between the ground plane end and the at least one antenna end, a length of the flexible thread between the ground plane end and the at least one antenna end being the second distance.

9. The antenna assembly according to claim 7, wherein the maximum expansion lock includes a semi-rigid arm extending between the ground plane end and the at least one antenna end, a length of the semi-rigid arm between the ground plane end and the at least one antenna end being the second distance.

10. The antenna assembly according to claim 9, wherein the semi-rigid arm is configured to bend upon a compression force sufficient to move the compressible dielectric standoff from the expanded state to the compressed state and is configured to resist bending upon an incidental force that is less than the compression force.

11. An antenna assembly array, comprising:

a first antenna assembly, including:

a first ground plane;

at least one first compressible dielectric standoff mounted on the first ground plane; and at least one first antenna mounted on the at least one first compressible dielectric standoff such that the at least one first antenna is spaced apart from the first ground plane; and a second antenna assembly, including:

a second ground plane;

at least one second compressible dielectric standoff mounted on the second ground plane;

at least one second antenna mounted on the at least one second compressible dielectric standoff such that the at least one second antenna is spaced apart from the second ground plane;

wherein the at least one first compressible dielectric standoff and the at least one second compressible dielectric standoff are moveable between a compressed state in which the at least one first antenna and the at least one second antenna are respectively spaced apart from the first ground plane and the second ground plane a first distance, and an expanded state in which the at least one first antenna and the at least one second antenna are respectively spaced apart from the first ground plane and the second ground plane a second distance, the first distance being smaller than the second distance; and wherein the antenna assembly array is moveable between a reduced-volume state in which the second antenna assembly is stacked over the first antenna assembly such that the at least one first antenna and the at least one second antenna contact each other in a face-to-face relationship and hold the at least one first compressible dielectric standoff and the at least one second compressible dielectric standoff in the compressed state, and an expanded-volume state in which the second antenna assembly is not stacked over the first antenna assembly such that the at least one first compressible dielectric standoff and the at least one second compressible dielectric standoff are in the expanded state.

12. The antenna assembly array according to claim 11, wherein in the expanded-volume state, the second antenna assembly is laterally adjacent the first antenna assembly with a flexible panel-to-panel interface connecting the first ground plane of the first antenna assembly to the second ground plane of the second antenna assembly.

13. A compressible dielectric standoff configured to mount at least one antenna on a ground plane of an antenna assembly, the compressible dielectric standoff comprising:

a ground plane end configured to contact the ground plane; and at least one antenna end configured to contact the at least one antenna, wherein the at least one antenna end includes:

a first stacked antenna end configured to contact a first stacked antenna; and a second stacked antenna end configured to contact a second stacked antenna stacked above the first stacked antenna;

means for moving the compressible dielectric standoff between a compressed state in which the ground plane end is spaced apart from the at least one antenna end a first distance, and an expanded state in which the ground plane end is spaced apart from the at least one antenna end a second distance, the first distance being smaller than the second distance.

14. The compressible dielectric standoff according to claim 13, further comprising:

a first dielectric standoff portion extending from the ground plane end to the first stacked antenna end; and a second dielectric standoff portion extending from the first stacked antenna end to the second stacked antenna end.

15. The compressible dielectric standoff according to claim 14, further comprising:

a spring embedded in the first dielectric standoff portion;

wherein the second dielectric standoff portion contacts the spring embedded in the first dielectric standoff portion at the first stacked antenna end such that when the compressible dielectric standoff moves from the expanded state to the compressed state, the second dielectric standoff portion compresses the spring.

16. The compressible dielectric standoff according to claim 15, wherein an outer diameter of the second dielectric standoff portion is less than an inner diameter of the first dielectric standoff portion.

* * * * *